(12) United States Patent
Kim (10) Patent No.: US 11,305,819 B2
(45) Date of Patent: Apr. 19, 2022

(54) OUTER PANEL FOR VEHICLE

(71) Applicants: Hyundai Motor Company, Seoul (KR); Kia Motors Corporation, Seoul (KR)

(72) Inventor: Do Hoi Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 92 days.

(21) Appl. No.: 16/985,489

(22) Filed: Aug. 5, 2020

(65) Prior Publication Data

US 2021/0269097 A1 Sep. 2, 2021

(30) Foreign Application Priority Data

Feb. 27, 2020 (KR) .................. 10-2020-0024137

(51) Int. Cl.
*B62D 25/02* (2006.01)
*B62D 65/16* (2006.01)
*B62D 65/02* (2006.01)
*B62D 27/06* (2006.01)

(52) U.S. Cl.
CPC ............. *B62D 25/02* (2013.01); *B62D 27/06* (2013.01); *B62D 65/024* (2013.01); *B62D 65/16* (2013.01)

(58) Field of Classification Search
CPC ...... B62D 25/02; B62D 27/06; B62D 65/024; B62D 65/16; B62D 29/043; B62D 27/02; B60J 5/0415; B60J 5/045; B60J 5/0468; B60Y 2304/05; B60Y 2304/07
USPC .................................... 296/203.03
See application file for complete search history.

(56) References Cited

U.S. PATENT DOCUMENTS

| 11,198,477 | B2* | 12/2021 | Coudron ............... B62D 27/06 |
| 2010/0187865 | A1 | 7/2010 | Malek et al. |
| 2015/0175212 | A1 | 6/2015 | Heo et al. |
| 2020/0307374 | A1* | 10/2020 | Yamaguchi ............ B60K 15/05 |

FOREIGN PATENT DOCUMENTS

| JP | H07132853 A | 5/1995 |
| KR | 20100086957 A | 8/2010 |
| KR | 20140091510 A | 7/2014 |
| KR | 101592645 B1 | 2/2016 |
| KR | 101836520 B1 | 3/2018 |

* cited by examiner

*Primary Examiner* — Pinel E Romain
(74) *Attorney, Agent, or Firm* — Slater Matsil, LLP (57) ABSTRACT

A method of assembling a vehicle including enclosing an outer edge of a vehicle body with an assembling structure that includes at least first and second parting members, and assembling an outer panel having a shape corresponding to the vehicle body by fitting the first parting member into the second parting member in a lateral direction and assembling the assembling structure.

20 Claims, 9 Drawing Sheets

OUTER PANEL FOR VEHICLE

CROSS-REFERENCE TO RELATED APPLICATIONS

This application claims priority to Korean Patent Application No. 10-2020-0024137, filed on Feb. 27, 2020, which application is hereby incorporated herein by reference.

TECHNICAL FIELD

The present disclosure relates to an outer panel for a vehicle.

BACKGROUND

A vehicle body having a general monocoque body structure is produced by processing and welding parts through press processing using a mold, which is disadvantageous in that large-scale facilities such as a press shop, a vehicle body welding shop, and a paint shop are required and a degree of freedom of design is low.

Therefore, recently, a vehicle is assembled by modularizing and standardizing each portion of a vehicle body that may be shared and assembling the standardized module according to a vehicle model. That is, as a common module may be used and assembled not only for a specific vehicle model, but also for other vehicle models, various models of vehicles may be produced without a large-scale facility.

Meanwhile, according to the related art, a vehicle body is welded with an outer panel enclosing the vehicle body, the outer panel corresponding to an exterior of a vehicle.

However, in the event that the type of the vehicle body is changed or a design of the vehicle is determined depending on a path of the vehicle body, a degree of freedom of design of the outer panel is lowered, and it is difficult to realize sharing of the outer panel, which is problematic.

Therefore, a frequent design change is required in the case of small quantity batch production or production in a smart factory, and as a result the number of molds is significantly increased, inevitably causing an increase in production costs.

In this regard, an outer panel having a new structure capable of overcoming the disadvantages of the related art and implementing an improved rigidity and a high degree of ease in assembly with a vehicle body has been demanded.

The matters described as the related art have been provided only for assisting in the understanding for the background of the present disclosure and should not be considered as corresponding to the related art known to those skilled in the art.

SUMMARY

The present disclosure relates to an outer panel for a vehicle. Particular embodiments provide an outer panel for a vehicle of which a structure is changed to improve a degree of ease in assembly with a vehicle body, productivity, and rigidity.

According to an embodiment of the present disclosure, an outer panel for a vehicle includes an outer panel having a shape corresponding to a vehicle body, assembled while enclosing an outer edge of the vehicle body, and formed by assembling at least two parting members in an assembling structure, wherein the assembling structure is a structure in which one parting member is fitted into and assembled with another parting member in a lateral direction.

The assembling structure may be a structure in which one parting member is fitted into and assembled with another parting member in the lateral direction in a state where the other parting member is assembled with the vehicle body.

In the assembling structure, an assembling hole may be formed in a first parting member assembled with the vehicle body, an assembling protrusion may be formed on an inner surface of a second parting member that faces the vehicle body, the assembling protrusion may pass through and be fitted into the assembling hole, and a hook portion may be formed in an expanded shape at an end portion of the assembling protrusion and be hooked to an edge of the assembling hole.

An elastic piece may protrude from one surface on an inner side of the assembling hole toward the other surface on the inner side of the assembling hole, and the assembling protrusion may be fitted between the elastic piece and the other surface on the inner side of the assembling hole.

One end of the elastic piece may be a fixed end fixed to an inner surface of the assembling hole, and the other end of the elastic piece may be a free end protruding by a predetermined length in a direction in which the assembling protrusion is fitted.

Overlapping regions that overlap with each other may be provided at a portion of the first parting member and a portion of the second parting member that come into contact with each other, respectively, the assembling hole and the assembling protrusion may be formed in the overlapping regions, respectively, and the assembling protrusion may be fitted into the assembling hole while overlapping the overlapping region of the second parting member and the overlapping region of the first parting member with each other.

A rib having a lattice shape may be formed on an inner surface of each parting member that faces the vehicle body.

A mounting bracket may be provided on an outer surface of the vehicle body, a mounting hole may be formed in the mounting bracket, and a mounting clip corresponding to the mounting hole may be provided on an inner surface of a parting member that faces the mounting bracket and be fastened in the mounting hole.

DETAILED DESCRIPTION OF ILLUSTRATIVE EMBODIMENTS

Exemplary embodiments of the present disclosure will be described in detail with reference to the accompanying drawings.

Figure 1:
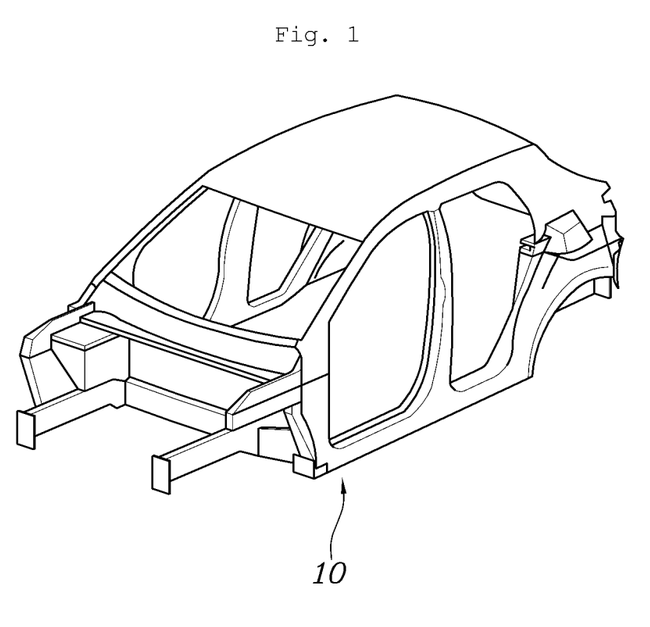
FIG. 1 is a view illustrating a vehicle body applicable to embodiments of the present disclosure.

FIG. 1 is a view illustrating a vehicle body 10 applicable to embodiments of the present disclosure. An outer panel 20 according to embodiments of the present disclosure may be applied to a monocoque type vehicle body, and preferably, may be applied to a modular type vehicle body of which each portion is modularized and assembled.

Figure 2:
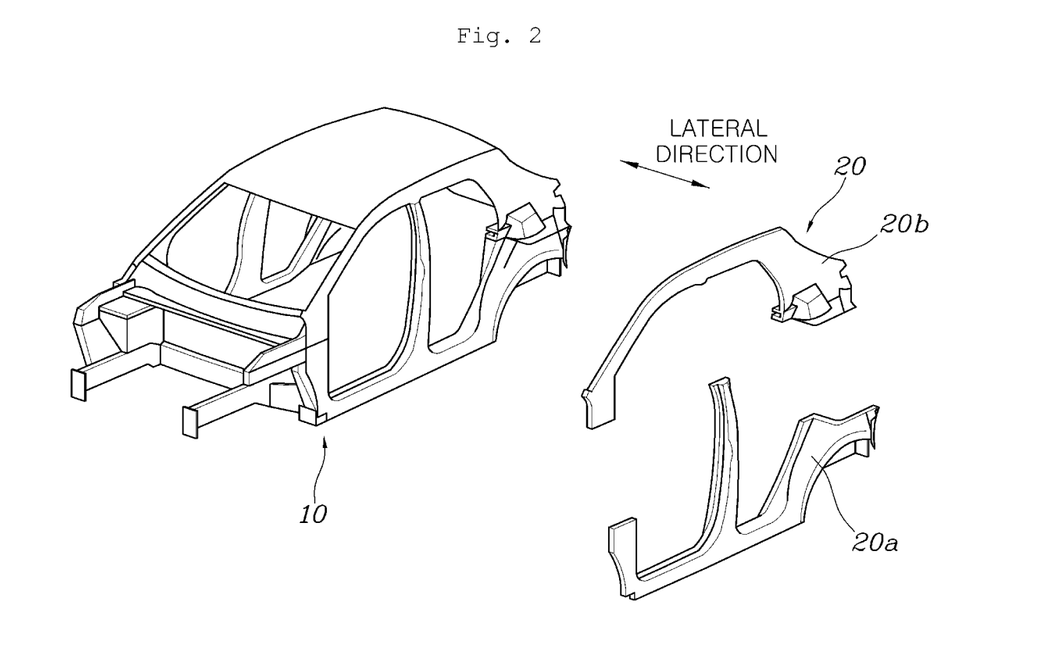
FIG. 2 is a view illustrating a state where an outer panel is assembled with the vehicle body of FIG. 1.

FIG. 2 is a view illustrating a state where an outer panel 20 is assembled with the vehicle body 10 of FIG. 1.

Referring to FIG. 2, the outer panel 20 has a shape corresponding to the vehicle body 10 and is assembled while enclosing an outer edge of the vehicle body 10. Further, the outer panel 20 is formed by assembling at least two parting members in an assembling structure.

Here, the assembling structure is a structure in which one parting member is fitted into and assembled with another parting member in a lateral direction.

For example, the outer panel 20 according to embodiments of the present disclosure may be the outer panel 20 covering a filler portion of the vehicle body 10 and a side sill portion at a lower end of the vehicle body 10.

Such an outer panel 20 may be divided into upper and lower parting members. An upper parting member 20b is fitted into and assembled with a lower parting member 20a in a lateral direction of the vehicle body 10 to form the outer panel 20, and the outer panel 20 may be fitted into and assembled with the vehicle body 10 in the lateral direction of the vehicle body 10.

That is, the outer panel 20 is coupled to the vehicle body 10 in a vehicle body production line according to the related art, but in the event that the assembling structure of the outer panel 20 is improved, the assembly of the outer panel 20 may be performed even in a trimming (assembling) process.

To this end, according to embodiments of the present disclosure, both of the upper and lower parting members are formed of a plastic material, or the upper parting member 20b is formed of a plastic material and the lower parting member 20a is formed of a steel material, and the two parting members are fitted and assembled. Therefore, the outer panel 20 may be assembled with the vehicle body 10 even in the assembling process, thereby improving the degree of ease in assembly of the outer panel 20.

Figure 7:
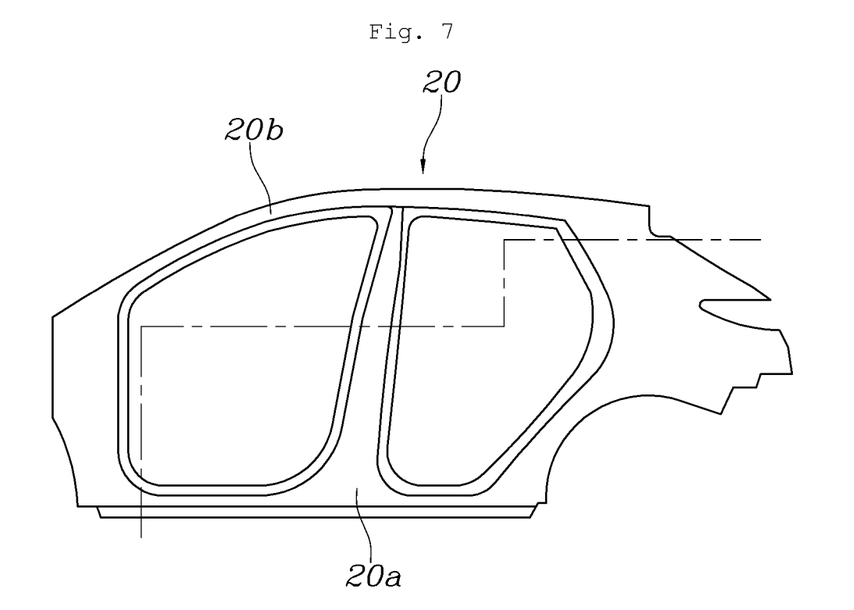
FIGS. 7 to 9 are views each illustrating a state where the outer panel according to embodiments of the present disclosure is divided into two parting members.
Figure 8:
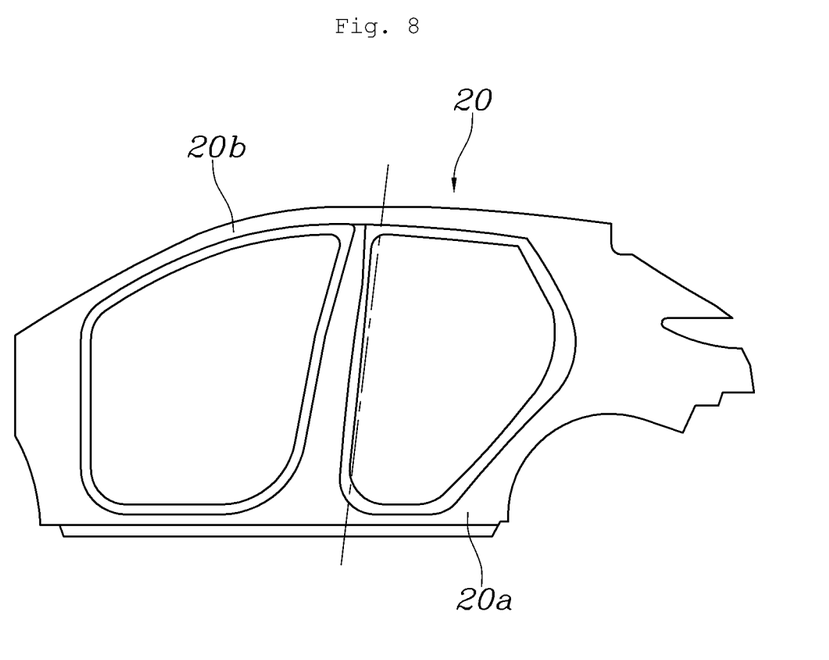
Figure 9:
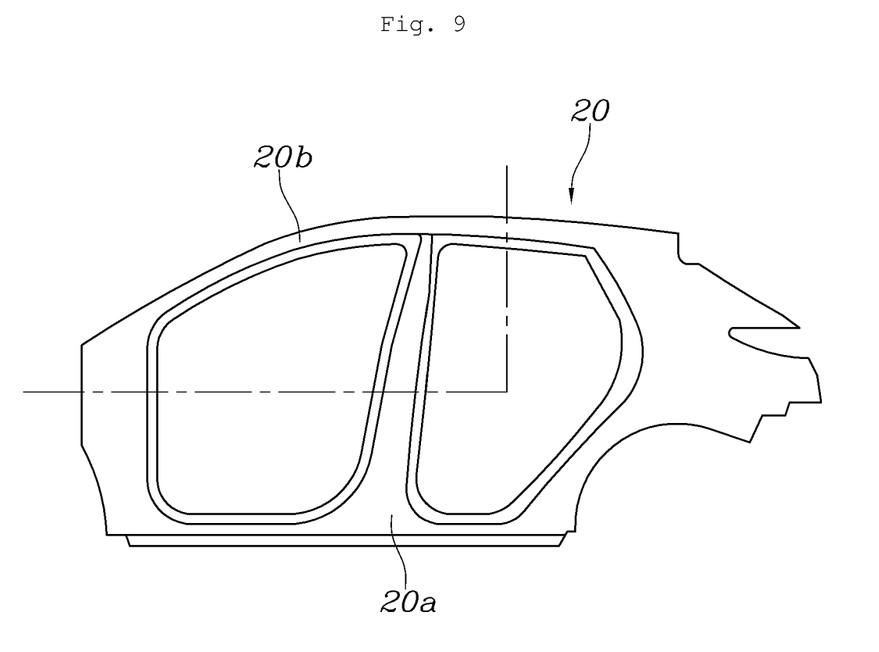

Further, parting surfaces of the parting members may be changed depending on a design of a modularized part as illustrated in FIGS. 7 to 9, and the outer panel 20 may also be divided into three or more parting members. Accordingly, the outer panel 20 may be applied to various modularized parts designs, such that the outer panel 20 may be designed without newly developing a mold for a design of each vehicle model, thereby greatly reducing production costs.

Specifically, the assembling structure is a structure in which one parting member is fitted into and assembled with another parting member in the lateral direction in a state where the other parting member is assembled with the vehicle body 10.

For example, the lower parting member 20a is assembled at a lower side surface of the vehicle body 10, and then the upper parting member 20b is assembled at an upper side surface of the vehicle body 10 while being fitted into and assembled with the lower parting member 20a in the lateral direction, thereby assembling the outer panel 20 with the vehicle body 10.

As such, the outer panel 20 is assembled by an assembling method in which two parting members are fitted at the side surface of the vehicle body 10 in the lateral direction. Therefore, the outer panel 20 is assembled with the vehicle body 10 without using a bonding method such as welding or adhesion, such that assembly man-hours are greatly reduced, thereby improving productivity and a degree of ease in assembly of the vehicle body 10 and the outer panel 20.

Figure 3:
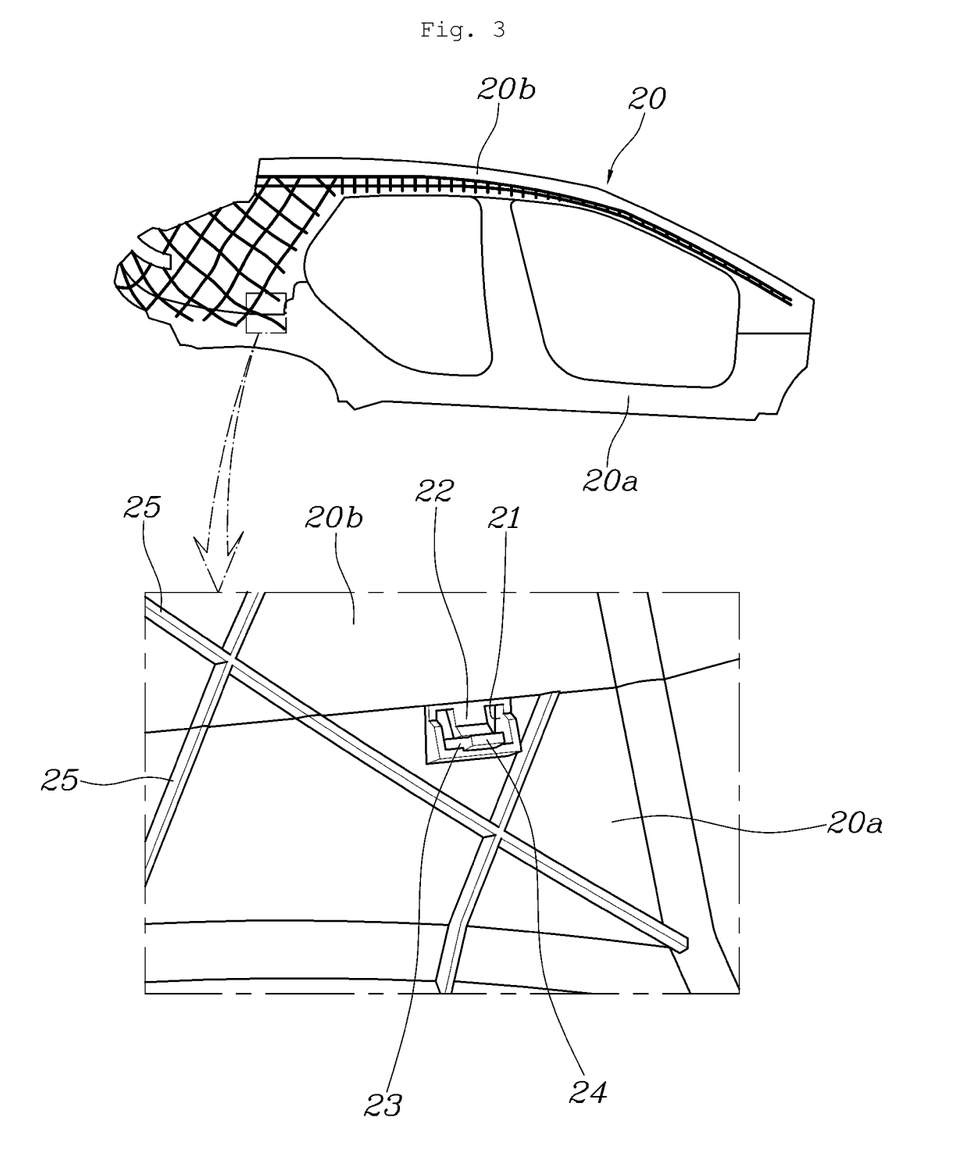
FIG. 3 is a view illustrating an assembling structure of parting members constituting an outer panel according to embodiments of the present disclosure.
Figure 4:
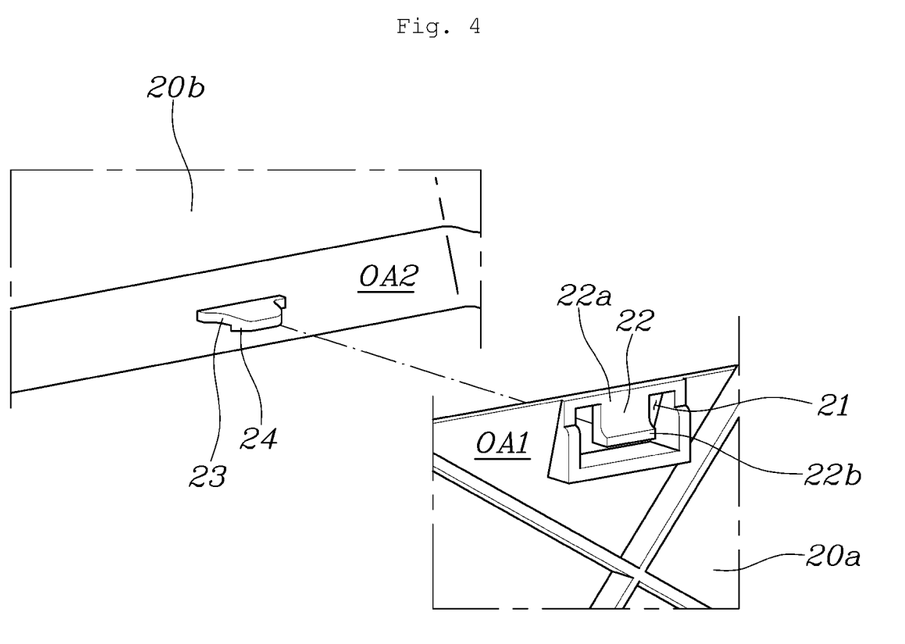
FIG. 4 is a view illustrating a state before assembling two parting members according to embodiments of the present disclosure.

Meanwhile, FIG. 3 is a view illustrating an assembling structure of the parting members constituting the outer panel 20 according to embodiments of the present disclosure, and FIG. 4 is a view illustrating a state before assembling two parting members according to embodiments of the present disclosure.

Referring to FIGS. 3 and 4, in the assembling structure, an assembling hole 21 is formed in a first parting member 20a assembled with the vehicle body 10, and an assembling protrusion 23 is formed on an inner surface of a second parting member 20b that faces the vehicle body 10.

The assembling protrusion 23 passes through and is fitted into the assembling hole 21, a hook portion 24 is formed in an expanded shape at an end portion of the assembling protrusion 23, and the hook portion 24 is hooked to an edge of the assembling hole 21.

Note that the first parting member 20a may be the lower parting member and the second parting member 20b may be the upper parting member in an embodiment of the present disclosure.

For example, the assembling protrusion 23 is formed in a flat tip shape, and one surface of the hook portion 24 at the end portion of the assembling protrusion 23 protrudes outward and is inclined downward. Further, a width portion of the assembling hole 21 into which the assembling protrusion 23 enters is formed in a slotted hole shape corresponding to the assembling protrusion 23.

That is, once the assembling protrusion 23 enters the assembling hole 21, the assembling protrusion 23 passes through and is fitted into the assembling hole 21. Here, since a width of the hook portion 24 of the assembling protrusion 23 is larger than a width of the assembling hole 21, the assembling protrusion 23 is pressurized in the assembling hole 21.

When the assembling protrusion 23 is pushed toward the inside of the assembling hole 21 by being applied with a force in this state, the hook portion 24 escapes from the assembling hole 21 and is hooked to the edge of the assembling hole 21, such that the assembling protrusion 23 is fitted into the assembling hole 21, thereby assembling the second parting member 20b with the first parting member 20a.

As two parting members are assembled by using the simple fitting and assembling structure of the assembling protrusion 23 and the assembling hole 21, the parts assembly man-hours are reduced, thereby greatly improving a degree of ease in assembly.

Here, multiple assembling holes 21 and multiple assembling protrusions 23 are provided along a portion of the first parting member 20a and a portion of the second parting member 20b that come into contact with each other, respectively, such that the first parting member 20a and the second parting member 20b may be firmly and stably assembled.

Referring to FIG. 4, an elastic piece 22 protrudes from one surface on an inner side of the assembling hole 21 toward the other surface on the inner side. Further, the assembling protrusion 23 is fitted between the other surface on the inner side of the assembling hole 21 and the elastic piece 22.

One end of the elastic piece 22 may be a fixed end 22a fixed to an inner surface of the assembling hole 21, and the other end of the elastic piece 22 may be a free end 22b protruding by a predetermined length in a direction in which the assembling protrusion 23 is fitted. Further, both sides of the elastic piece 22 are spaced apart from an inner side surface of the assembling hole 21. Therefore, the assembling hole 21 may be formed in a "U"-letter shape, and the elastic piece 22 is formed at a central portion of an upper end of the inner side surface of the assembling hole 21, and thus has elasticity.

That is, when the hook portion 24 of the assembling protrusion 23 pushes the elastic piece 22 at the time of passing through the assembling hole 21, the free end 22b of the elastic piece 22 is elastically bent with respect to the fixed end 22a of the elastic piece 22, such that a force required to assemble the assembling protrusion 23 is decreased, thereby improving a degree of ease in assembly.

Further, as an end portion of the free end 22b of the elastic piece 22 extends by a predetermined length, a contact area of the end portion of the free end 22b supporting an upper surface of the assembling protrusion 23 in a state where the assembling protrusion 23 is fitted into the assembling hole 21 is relatively increased, such that the escape of the assembling protrusion 23 from the assembling hole 21 is suppressed, thereby making it possible to maintain a firmly fitted state.

In addition, as illustrated in FIG. 4, overlapping regions OA1 and OA2 that overlap with each other are provided at a portion of the first parting member 20a and a portion of the second parting member 20b that come into contact with each other, respectively.

The assembling hole 21 and the assembling protrusion 23 are formed in the overlapping regions OA1 and OA2, respectively, and the assembling protrusion 23 is fitted into the assembling hole 21 while overlapping the overlapping region OA2 of the second parting member 20b and the overlapping region OA1 of the first parting member 20a with each other.

For example, in the outer panel 20, the overlapping region OA1 is formed at an upper end of the lower parting member 20a and the overlapping region OA2 is formed at a lower end of the upper parting member 20b.

As the overlapping region OA2 at the lower end of the upper parting member 20b overlaps with the overlapping region OA1 at the upper end of the lower parting member 20a in a state where the lower parting member 20a is assembled with the vehicle body 10, a gap between the two parting members is removed and a supporting area is increased, such that it is possible to more firmly assemble the outer panel 20.

Further, referring to FIG. 3, according to embodiments of the present disclosure, a rib 25 having a lattice shape may be formed on an inner surface of the parting member that faces the vehicle body 10.

That is, as the rib 25 is formed on a parting member formed of a plastic material in a diagonal direction, rigidity of the outer panel 20 is improved, such that deformation of the outer panel 20 on the vehicle body 10, which is a chronic problem, may be suppressed.

Figure 5:
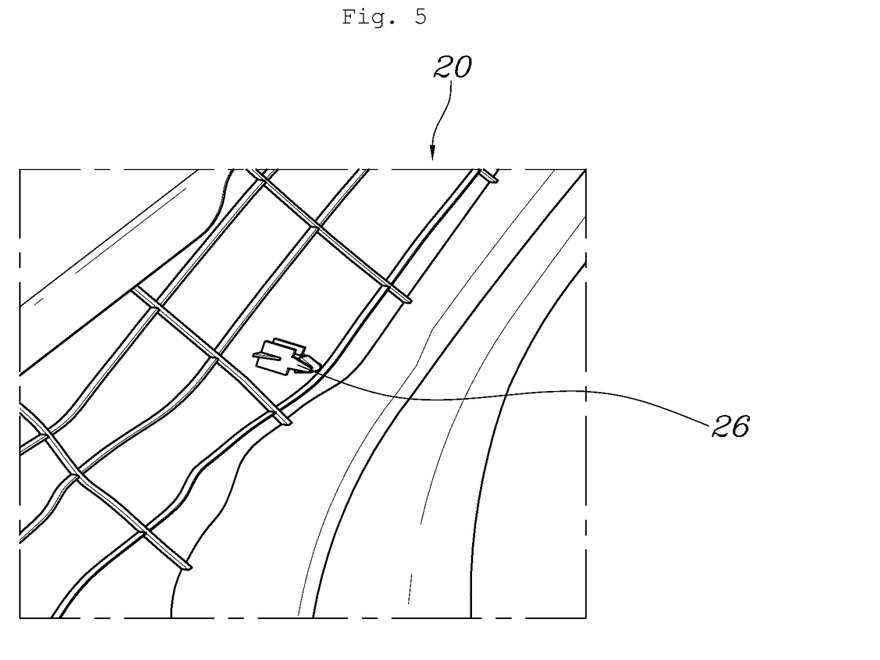
FIG. 5 is a view illustrating a mounting clip formed on the parting member according to embodiments of the present disclosure.
Figure 6:
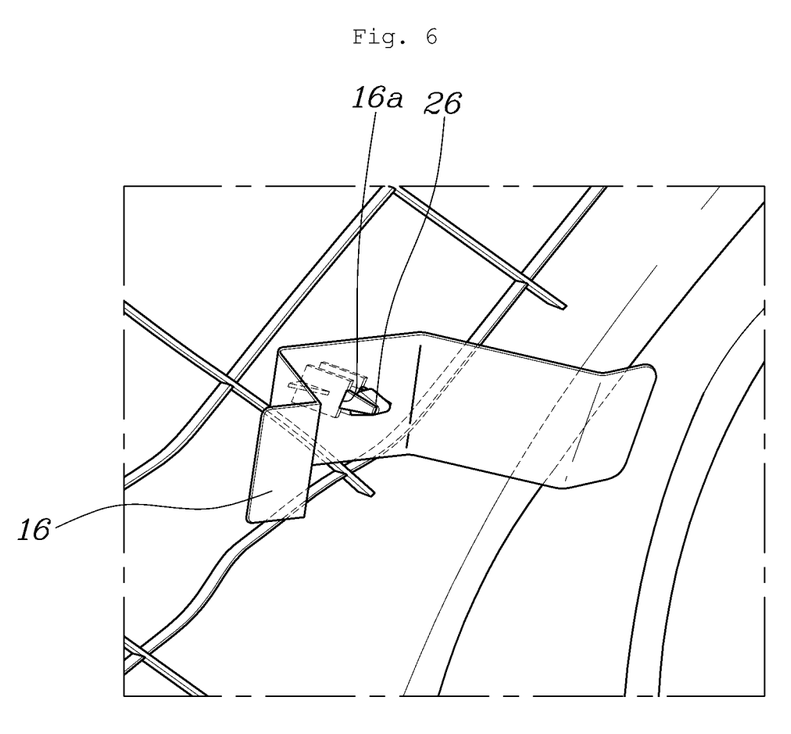
FIG. 6 is a view illustrating a state where the mounting clip according to embodiments of the present disclosure is assembled with a mounting bracket of the vehicle body.

FIG. 5 is a view illustrating a mounting clip 26 formed on the parting member according to embodiments of the present disclosure, and FIG. 6 is a view illustrating a state where the mounting clip 26 according to embodiments of the present disclosure is assembled with a mounting bracket 16 of the vehicle body 10.

Referring to FIG. 6, the mounting bracket 16 is provided on an outer surface of the vehicle body 10 and a mounting hole 16a is formed in a middle portion of the mounting bracket 16.

Further, the mounting clip 26 corresponding to the mounting hole 16a is provided on the inner surface of the parting member that faces the mounting bracket 16, and the mounting clip 26 is fastened in the mounting hole 16a.

Specifically, an end portion of the mounting clip 26 has an arrowhead shape, and a cross-sectional area of the mounting hole 16a is smaller than a maximum cross-sectional area of the arrowhead-shaped portion. Therefore, the arrowhead-shaped portion of the mounting clip 26 is forcibly fitted into the mounting hole 16a, and thus the mounting clip 26 fastened in the mounting hole 16a is not easily separated from the mounting hole 16a, thereby improving a degree of ease in assembly of the outer panel 20 and the vehicle body 10.

As described above, according to embodiments of the present disclosure, the outer panel 20 is assembled by the assembling method in which two parting members are fitted at the side surface of the vehicle body 10 in the lateral direction. Therefore, the outer panel 20 is easily assembled, such that assembly man-hours are reduced, thereby improving productivity and a degree of ease in assembly of the vehicle body 10 and the outer panel 20.

In addition, as the parting members are dividedly provided and assembled for each portion of the modularized vehicle body 10, the outer panel 20 may be applied to various modularized parts designs, such that the outer panel 20 may be designed without newly developing a mold for a design of each vehicle model, thereby reducing production costs.

According to embodiments of the present disclosure, the outer panel is assembled by the assembling method in which two parting members are fitted at the side surface of the vehicle body in the lateral direction. Therefore, the outer panel itself is easily assembled and is easily assembled with the vehicle body, such that an assembly man-hours are reduced, thereby improving a degree of ease in assembly of the vehicle body and the outer panel.

Further, as the rib is formed on a parting member formed of a plastic material in a diagonal direction, rigidity of the outer panel is improved, such that deformation of the outer panel on the vehicle body, which is a chronic problem, may be suppressed.

In addition, as the parting members are dividedly provided and assembled for each portion of the modularized vehicle body so as to correspond to the shape of each portion, the outer panel may be applied to various modularized parts designs, such that the outer panel may be designed without newly developing a mold for a design of each vehicle model, thereby reducing production costs.

Meanwhile, although specific examples of the present disclosure have been described above in detail, it is obvious to those skilled in the art that various modifications and alterations may be made without departing from the spirit and scope of the present disclosure. In addition, it is obvious that these modifications and alterations are within the following claims.

What is claimed is:

1. A method of assembling a vehicle, the method comprising:
    enclosing an outer edge of a vehicle body with an assembling structure that includes at least first and second parting members; and
    assembling an outer panel having a shape corresponding to the vehicle body by fitting the first parting member into the second parting member in a lateral direction and assembling the assembling structure.

2. The method of claim 1, wherein assembling the outer panel comprises fitting the first parting member into the second parting member in the lateral direction when the second parting member is assembled with the vehicle body.

3. The method of claim 2, wherein an assembling hole is formed in the second parting member assembled with the vehicle body and an assembling protrusion is formed on an inner surface of the first parting member that faces the vehicle body, a hook portion being formed in an expanded shape at an end portion of the assembling protrusion, wherein assembling the outer panel comprises:
passing the assembling protrusion through the assembling hole; and
hooking the hook portion to an edge of the assembling hole.

4. The method of claim 3, wherein an elastic piece protrudes from one surface on an inner side of the assembling hole toward the other surface on the inner side of the assembling hole; and
wherein passing the assembling protrusion through the assembling hole comprises fitting the assembling protrusion between the elastic piece and another surface on the inner side of the assembling hole.

5. The method of claim 4, wherein a first end of the elastic piece is a fixed end fixed to an inner surface of the assembling hole and a second end of the elastic piece is a free end protruding by a predetermined length in a direction in which the assembling protrusion is fitted.

6. The method of claim 3, wherein overlapping regions that overlap with each other are provided at a portion of the first parting member and a portion of the second parting member that come into contact with each other, respectively, and the assembling hole and the assembling protrusion are formed in the overlapping regions, respectively, wherein passing the assembling protrusion through the assembling hole comprises:
fitting the assembling protrusion into the assembling hole while overlapping the overlapping region of the second parting member and the overlapping region of the first parting member with each other.

7. The method of claim 1, wherein the first parting member faces the vehicle body and wherein a rib having a lattice shape is formed on an inner surface of the first parting member.

8. The method of claim 1, wherein a mounting bracket is provided on an outer surface of the vehicle body, a mounting hole is formed in the mounting bracket, and a mounting clip corresponding to the mounting hole is provided on an inner surface of the first parting member, wherein assembling the outer panel comprises fastening the mounting clip in the mounting hole.

9. An outer panel for a vehicle, the outer panel having a shape corresponding to a vehicle body and assembled while enclosing an outer edge of the vehicle body, the outer panel comprising:
an assembling structure comprising at least two parting members, wherein one parting member is fitted into and assembled with another parting member in a lateral direction.

10. The outer panel of claim 9, wherein the assembling structure comprises one parting member fitted into and assembled with another parting member in the lateral direction in a state where the another parting member is assembled with the vehicle body.

11. The outer panel of claim 9, wherein:
an assembling hole is formed in a first parting member assembled with the vehicle body;
an assembling protrusion is formed on an inner surface of a second parting member that faces the vehicle body;
the assembling protrusion passes through and is fitted into the assembling hole; and
a hook portion is formed in an expanded shape at an end portion of the assembling protrusion and is hooked to an edge of the assembling hole.

12. The outer panel of claim 11, further comprising an elastic piece protruding from a first surface on an inner side of the assembling hole toward a second surface on the inner side of the assembling hole, wherein the assembling protrusion is fitted between the elastic piece and the second surface on the inner side of the assembling hole.

13. The outer panel of claim 12, wherein:
a first end of the elastic piece is a fixed end fixed to an inner surface of the assembling hole; and
a second end of the elastic piece is a free end protruding by a predetermined length in a direction in which the assembling protrusion is fitted.

14. The outer panel of claim 11, wherein:
overlapping regions that overlap with each other are provided at a portion of the first parting member and a portion of the second parting member that come into contact with each other, respectively;
the assembling hole and the assembling protrusion are formed in the overlapping regions, respectively; and
the assembling protrusion is fitted into the assembling hole while overlapping the overlapping region of the second parting member and the overlapping region of the first parting member with each other.

15. The outer panel of claim 9, further comprising a rib having a lattice shape formed on an inner surface of a parting member of the at least two parting members that faces the vehicle body.

16. The outer panel of claim 9, further comprising:
a mounting bracket provided on an outer surface of the vehicle body;
a mounting hole formed in the mounting bracket; and
a mounting clip corresponding to the mounting hole provided on an inner surface of a parting member that faces the mounting bracket and fastened in the mounting hole.

17. A vehicle comprising:
a vehicle body; and
an outer panel having a shape corresponding to a portion of the vehicle body, the outer panel comprising an assembling structure comprising:
a first parting member; and
a second parting member fitted into and assembled with the first parting member in a lateral direction.

18. The vehicle of claim 17, wherein the first parting member is assembled with the vehicle body, and the second parting member is fitted into and assembled with the first parting member in the lateral direction.

19. The vehicle of claim 17, wherein:
an assembling hole is formed in the first parting member, the first parting member being assembled with the vehicle body;
an assembling protrusion is formed on an inner surface of the second parting member, the inner surface facing the vehicle body;
the assembling protrusion passes through and is fitted into the assembling hole; and
a hook portion is formed in an expanded shape at an end portion of the assembling protrusion and is hooked to an edge of the assembling hole.

20. The vehicle of claim 19, further comprising an elastic piece protruding from a first surface on an inner side of the assembling hole toward a second surface on the inner side of the assembling hole, wherein the assembling protrusion is fitted between the elastic piece and the second surface on the inner side of the assembling hole.

* * * * *